United States Patent [19]
Linton et al.

[11] Patent Number: 5,685,572
[45] Date of Patent: Nov. 11, 1997

[54] FITTING AND PIPE JOINT USING THE FITTING

[75] Inventors: Valerie Margaret Linton, Newcastle-upon-Tyne; Leslie Maine, Cramlington, both of Great Britain

[73] Assignee: British Gas plc, London, United Kingdom

[21] Appl. No.: 588,358

[22] Filed: Jan. 18, 1996

[30] Foreign Application Priority Data

Jan. 23, 1995 [GB] United Kingdom .................. 9501271

[51] Int. Cl.$^6$ .................................................. F16L 47/02
[52] U.S. Cl. .......................... 285/21.2; 285/370; 285/332; 285/397; 219/544; 219/535
[58] Field of Search .............................. 285/21.1, 21.2, 285/370, 332, 397, 47, 50, 53, 238, 295; 219/544, 535; 56/275.1

[56] References Cited

U.S. PATENT DOCUMENTS

| | | | |
|---|---|---|---|
| 3,476,413 | 11/1969 | Coberly et al. | 285/370 X |
| 3,508,766 | 4/1970 | Kessler et al. | 285/370 X |
| 5,104,152 | 4/1992 | Galfant | 285/47 |
| 5,150,922 | 9/1992 | Nakashiba et al. | 285/21.2 |

FOREIGN PATENT DOCUMENTS

| | | | |
|---|---|---|---|
| 5-52288 | 3/1993 | Japan | 285/21 |
| 5-187588 | 7/1993 | Japan | 285/21 |
| 1214632 | 12/1970 | United Kingdom | 285/21 |
| 11616 | 11/1989 | WIPO | 285/21 |

*Primary Examiner*—Terry Lee Melius
*Assistant Examiner*—Heather Shackelford
*Attorney, Agent, or Firm*—Larson and Taylor

[57] ABSTRACT

The invention provides a joint 80 for two steel pipes 50, 52 each containing a liner 54, 56 of polyethylene. The invention also provides an electrofusion fitting for joining the liners 54, 56; a method of making the fitting and a method of making the joint 80. The joint 80 consists of an electrofusion fitting having two frusto-conical outer end surfaces which match similar surfaces on the insides of the end portions of the liners 54, 56. Fusion welded joints are formed at the interfaces between the frusto-conical surfaces. A body of insulating material 66 is received in a central recess in the fitting and protects the fitting from the high temperature of the seam 70 between the steel pipes 50, 52. The frusto-conical surfaces make an angle of 10° or less with the longitudinal axis of the fitting. A support body 14 of metal or of synthetic plastics material contained by the electrofusion fitting ensures that the fitting is adequately supported during electrofusion.

17 Claims, 3 Drawing Sheets

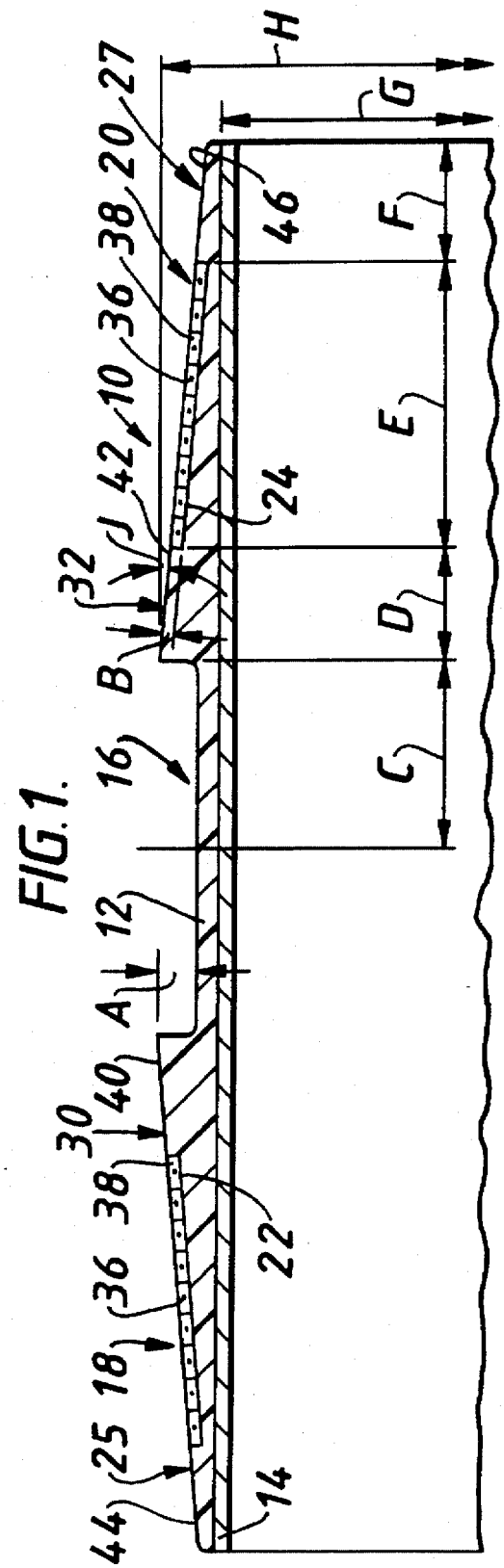
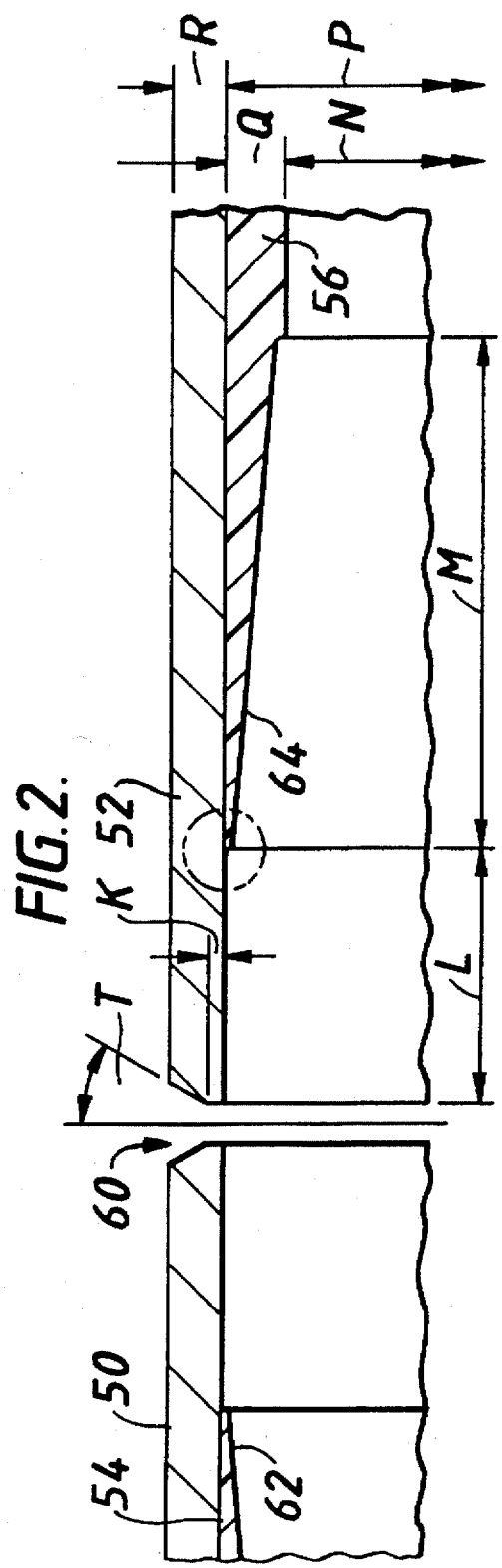

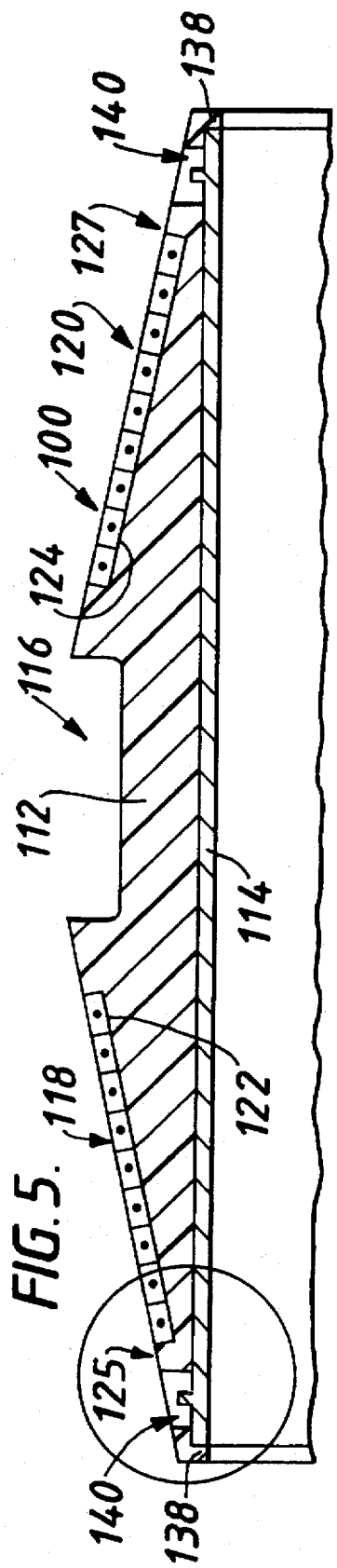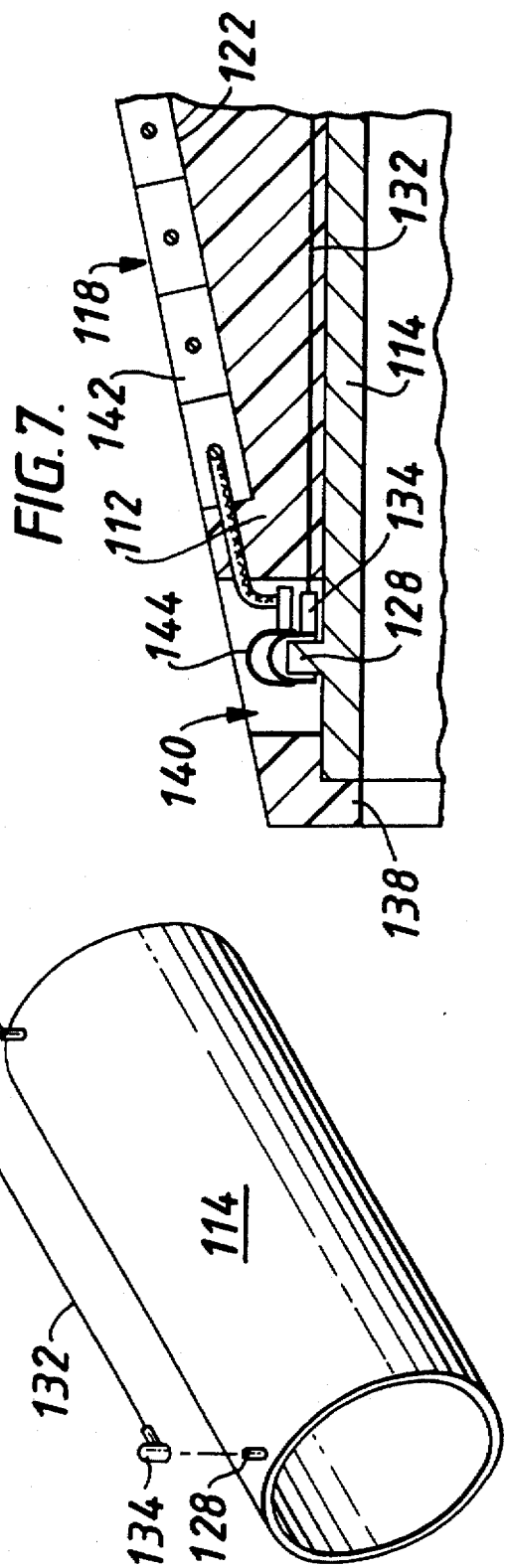

5,685,572

FITTING AND PIPE JOINT USING THE FITTING

BACKGROUND OF THE INVENTION

The invention relates to an electrofusion fitting and to a method of making the fitting to a pipe joint using the fitting; and to a method of making a joint between two steel pipes using the fitting.

In particular, the invention further relates to the joining of steel pipes each of which contains a thermoplastic lining of, for example, polyethylene in order to render the resulting pipeline capable of handling corrosive liquids or gases.

The steel pipe may be lined by any suitable process, for example by a process involving passing the liner through a die, to reduce its outer diameter, and then through the pipe. Thereafter the pipe reverts towards the outside diameter which it had before it was passed through the die.

European patent application No. EP 89310367.1 (Publication No. EP 0366299) in the name of The Welding Institute shows an electrofusion fitting for joining two thermoplastic liners of two steel pipes arranged end-to-end each containing one of the liners, the fitting comprising an open-ended tubular thermoplastic body the outside surface of each end region of which is adjacent to a heating coil, the coils being connected in series and the outside surface of the body having a central, annular recess containing insulating material.

This known electrofusion fitting is characterised by features according to the invention below.

The opposing ends of the liners in EP 0366299 are shaped to provide a tapered recess which accommodates the fitting. The insulating material was positioned opposite the opposed ends of the steel pipes. It was proposed in EP 0366299 to energise the heating coils to join the fitting to the liners by fusion welded joints and then to join the ends of the steel pipes by a circumferential arc-welded joint. During arc-welding the insulating material protected the underlying thermoplastic fitting from the high temperature of the arc.

The insulating material shown in EP 0366299 consisted of a band of ceramic inserts or segments preferably rectangular in cross-section immediately underlying the zone of the arc. Those ceramic inserts were supported by further thermal isolation in the form of low heat transfer material such as asbestos fibre, kaolin material or a heat reflective layer such as aluminium coated composite material. In a further embodiment, a fibre-reinforced high temperature plastics material was shown underlying the further thermal insulation just mentioned.

According to the invention, an electrofusion fitting is characterised in that said outside surface at each end region of the body makes an angle of less than 10° with the longitudinal axis of the body and the surface includes a first and a second annular zone between which lies said heating coil, said zones not being melted when said coil is energized, and the body containing a hollow cylindrical support body which extends parallel to said axis opposite to the heating coils and all said zones.

SUMMARY OF THE INVENTION

According to the invention, a joint between two steel pipes arranged end to end, each containing a thermoplastic liner, the two liners being shaped at their opposing ends so as to afford a recess which accommodates an electrofusion fitting comprising an open-ended tubular thermoplastic body part of the outside surface of each end region of which is joined to one of the liners by a fusion welded joint and the opposed ends of the steel pipes are joined by an arc-welded joint is characterized in that said electrofusion fitting is a fitting according to the invention.

A method of making such an electrofusion fitting according to the invention is characterized by:

(a) arranging the support body within the thermoplastic body;

(b) machining the outside surface of the thermoplastic body to form the central, annular recess;

(c) machining the outside end surfaces of the thermoplastic body so that the machined surfaces make an angle of less than 10° with the longitudinal axis of the fitting;

(d) winding wire to form two heating coils one on each of said machined surfaces the windings of each coil being placed in a recess or groove in the surface or in a groove formed by winding the wire while it is hot onto the surface.

(e) connecting the outer ends of said coils to one another;

(f) connecting the inner ends of said coils to leads which are formed of wire compatible with the material which is to form the welded joint between the ends of the steel pipes;

(g) fitting insulating sleeves to the leads;

(h) positioning the leads so that they protrude from the fitting at two points spaced apart on the circumference midway between the ends of the fitting; and (i) positioning a body of insulating material in said central, annular recess of said body.

In a modification, in place of steps (h) to (j), a tapped electrical connector is positioned on said body for each coil and each of the coils is connected to its respective connector.

According to the invention, a method of making a joint between two steel pipes arranged end to end each containing a thermoplastic liner, the two liners being shaped at their opposing ends so as to afford a recess which accommodates an electrofusion fitting is characterized in that the method uses an electrofusion fitting according to the invention which is energized by connecting an electrical supply to the windings and, after the fitting is joined by welded joints to the linings, the ends of the steel pipes are joined by arc welding to produce a welded joint.

DESCRIPTION OF PREFERRED EMBODIMENTS

An electrofusion fitting, a pipe joint using it, a method of making the fitting and a method of making a pipe joint will now be described by way of example as embodiments of the invention with reference to the accompanying drawings in which:

FIG. 1 is a longitudinal vertical section through part of a first embodiment of electrofusion fitting;

FIG. 2 is a longitudinal section through parts of two pipes arranged end-to-end which are to be joined;

FIG. 5 is a longitudinal vertical section through part of a second embodiment of electrofusion fitting;

FIG. 6 is a three-dimensional view (on a reduced scale) of a support body contained within the fitting shown in FIG. 5; and FIG. 7 is a scrap detail vertical section through the part of FIG. 5 (on an enlarged scale) contained within the circle shown in FIG. 5.

Figure 3:
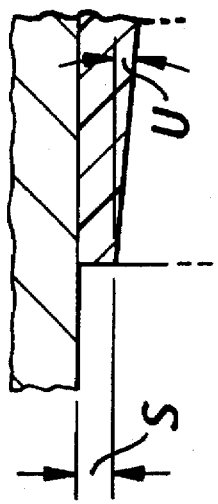
FIG. 3 is an enlarged scrap-view of the part of FIG. 2 enclosed by a circle.

The first embodiment of electrofusion fitting 10 shown in FIG. 1 consists of the following main items: an open-ended tubular, thermoplastic, e.g. polyethylene body 12; a hollow, metal, e.g. stainless duplex steel, support body 14 contained within the body 12; a central, annular recess 16 formed in the external surface of the body 12; and a first heating coil 18 and a second heating coil 20, which are wound in respective annular machined recesses 22, 24 in the outside surface portions 25, 27 of the body 12.

The electrofusion fitting 10 has, as typical dimensions, the dimensions shown below by way of example:

| Dimension | Magnitude in millimeters (mm) |
|---|---|
| A | 5.0 |
| B | 1.42 |
| C | 25.0 |
| D | 15.0 |
| E | 37.0 |
| F | 15.0 |
| G | 192.0 |
| H | 207.0 |
| | Magnitude in angular degrees (°) |
| J | 5.10 |

The electrofusion fitting 10 shown in FIG. 1 is made as follows:

(a) The metal support body 14 has a length of 184.0 mm and an initial outside diameter of 192.38 mm at ambient temperature. Its wall thickness is 2.0 mm. The body 14 is cooled until its final cooled outer diameter is less than the inner diameter of the thermoplastic body 12.

The two bodies 12 and 14 are then telescoped so that the body 12 contains the metal body 14, as shown in FIG. 1.

(b) The outside surface of the thermoplastic body 12 is machined to form the central, annular recess 16.

(c) The outside surface of the thermoplastic body 12 is machined so that each end region of the body 12 is frusto-conical at 30, 32. The angle which the frusto-conical surface 30, 32 makes with the longitudinal axis of the body 12 is 5.10.

In general, this angle is less than 10°.

(d) Each frusto-conical surface 30, 32 is machined to form the winding recesses 22, 24. Passages (not shown) are also machined between the recesses 22, 24 and the central recess 16.

(e) Two heating coils 18 and 20 are wound in the recesses 22, 24. Before winding commences the outer end of each wire is connected to a small screw (not shown) screwed into the metal support body 14.

Each winding is made of turns of resistance wire 36 embedded in a rectangular-section thermoplastic (e.g. polyethylene) strip 38 as shown in FIG. 1.

The coils 18, 20 are thus connected in series by the metal body 14.

(f) The inner ends of said coils 18, 20 are each connected to lengths of wire (e.g. welding wire not shown) which is compatible with the material which is to form the welded joint between the ends of the steel pipes (FIG. 2).

(g) The lengths of wire thus attached are encased in insulating sleeves (e.g. of fibreglass) and are positioned in the passages just mentioned and enter the central recess 16. The lengths form leads which are bent outwardly so that they protrude from the fitting 10 at two points, spaced apart on the circumference midway between the ends of the fitting.

(h) Finally, a body of insulating material (FIG. 2) is positioned in the central recess 16. The body is C shaped when first applied to the body 12, the C shape embracing the body 12. Then, the body of insulating material is stretched around the body 12 until the two ends overlap and the two ends can be moulded together.

The insulating material contains moisture which facilitates moulding of the body around the body 12.

After a time, the insulating material dries out and a mass of material similar in consistency to plaster is formed on the recess 16.

One form of preferred insulating material is obtainable from Burntstone Ceramic Limited of 19 Redgates, Walkington, Beverly, North Humberside HU17 8TS under the description Refractory Sheet Type A Moldable. The material comprises a mixture of aluminium oxide and alumino-silicate fibres with some 35–40% water which it loses when it dries, 1% of organic binder and a trace of ammonia.

After the material has been placed in position and shaped to the required shape, it is heated to drive off the water.

The material becomes hard and dry and then consists in a mixture which comprises some 85% by weight of aluminium oxide and some 15% by weight of vitreous alumino-silicate fibres.

As an alternative to using the two lengths of wire to form the leads described above, the length of wire from each heating coil 18, 20 can be connected to respective tapped electrical terminals positioned on the body 12. The terminals can receive screwed connectors through which an electrical supply (not shown) can be connected to the fitting 10 when the time comes to use the fitting in the making of a joint between the ends of pipes (FIG. 2).

The outside surface portions 25, 27 each have a first zone 40, 42 spaced from a second zone 44, 46 which are not melted when the heating coils are energized.

The steel pipes 50, 52 to be joined are shown in FIG. 2. Each pipe 50, 52 contains a thermoplastic liner 54, 56 respectively (e.g. of polyethylene) which has been passed through a die (not shown) and through the pipe to reduce the diameter of the liner. Thereafter, the liner has reverted towards the outside diameter which it had before it was passed through the die.

Figure 4:
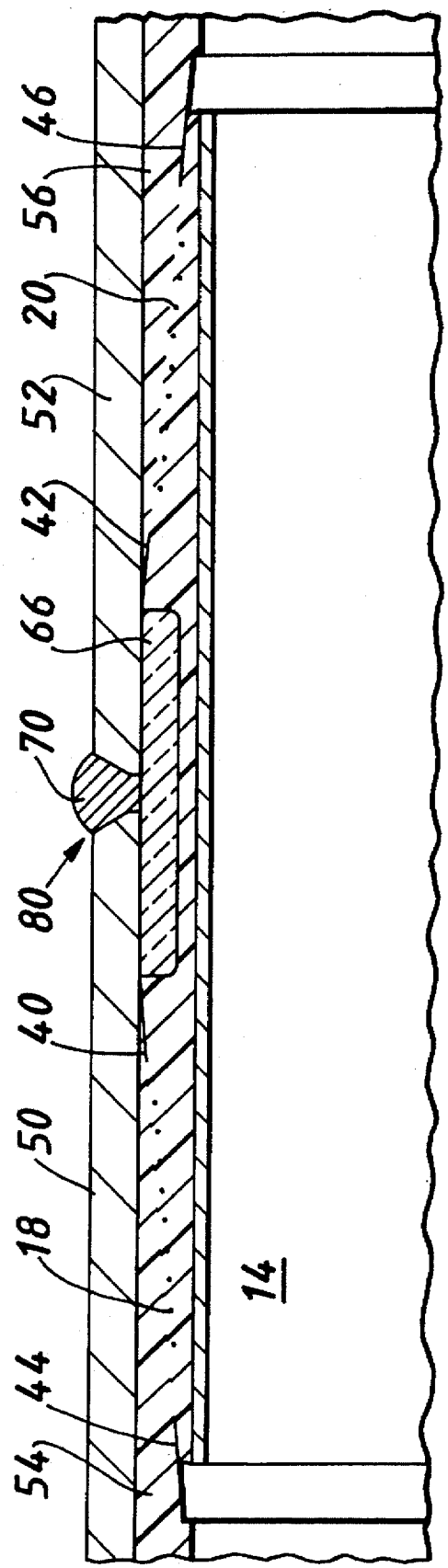
FIG. 4 is a longitudinal section through part of a finished joint between two pipes, including a fitting as shown in FIG. 1.

The ends of the liners 54, 56 to be joined are cut back and tapered as shown using a proprietary machine (not shown). The ends of the steel pipes 50, 52 are shaped as shown to prepare them for arc welding. It will be realised that FIG. 2 shows both pipes 50, 52 in the positions which they occupy when the electrofusion fitting is also in position between the pipes as shown in FIG. 4.

FIGS. 2 and 3 show the following examples of dimensions:

| Dimension | Magnitude in millimeters (mm) |
|---|---|
| K | 1.5 |
| L | 33.0 |
| M | 64.0 |
| N | 192.0 |

-continued

| Dimension | |
|---|---|
| P | 207.0 |
| Q | 7.5 |
| R | 6.5 |
| S | 0.76 |
| Magnitude in angular degrees (°) | |
| T | 30 |
| U | 5.10 |

The ends of the liners 54, 56 when cut and tapered as shown, and when the pipes occupy the positions shown in FIG. 2, form an annular recess which accommodates the electrofusion fitting 10, as shown in FIG. 4.

The pipes 50, 52 are assembled with the electrofusion fitting 10. Hydraulic cylinders (not shown) are used to move the pipes axially. A spacer ring in two parts is used to ensure that the gap 60 is preserved when the pipes 50, 52 are pulled together during assembly.

The parts occupy their true positions ready for joining as shown in FIG. 4, though that figure shows the completed joint 80 after the liners have been joined and after the steel pipes have been joined. The outside surface portions 25, 27 of the fitting 10 touch the correspondingly tapered surfaces 62, 64 of the liners 54, 56 and the body of insulation material 66 (FIG. 4) straddles the gap 60.

The leads, described above, are fed through the gap 60 and attached to electrical connectors attached to conductors connected to an electrical supply (not shown). The pipes 50, 52 are held fixed by the hydraulic rams already mentioned. At this point the steel pipes may be tack welded together, to provide stability during the electrofusion operation, next described.

The electrical supply is switched on and the heating coils 18, 20 are energized for a sufficient time to melt the polyethylene casing 38 surrounding the heating wire and to melt the polyethylene of the electrofusion fitting 10 adjacent to the recesses 22, 24. Also, the polyethylene adjacent the surfaces 62, 64 of the liners 54, 56 is also melted.

The zones 40, 44 and 42, 46 do not melt.

The molten polyethylene is not subjected to the same degree of movement as occurs in a conventional electrofusion coupler, which initially has a clearance between it and the pipes it is intended to join. By contrast the electrofusion fitting according to the invention closely engages the surfaces 62, 64 of the liners. The molten polyethylene is trapped between the liners 54, 56, and the zones 40, 44 and 42, 46. Also, the metal support body 14 acts to keep the body 12 of the electrofusion fitting 10 in close engagement with the liners 54, 56. This is very important, especially adjacent to the zones 44 and 46. Despite the relative lack of movement of the molten polyethylene, the fitting 10 forms two fusion welded joints at the interfaces between the tapered surfaces 40, 42 of the body 12 and the tapered surfaces 62, 64 of the liners. The metal support body 14 supports the fitting during the electrofusion operation and prevents distortion by the pressure generated within the molten surfaces expand.

When the period of electrofusion welding has elapsed the supply is switched off and the assembly allowed to cool.

The leads to the heating coils 18, 20 which are in the gap 60 are carefully removed leaving the gap 60 free from any obstruction. The base of the gap 60 is formed by the external surface of the body 66 of insulation material.

The gap 60 is now filled with a base run of filler material and further runs of filler material applied using an arc-welded technique until the gap is filled up as shown at 70 in FIG. 4.

The finished joint 80 is normally one of a number of similar joints between pipes which ultimately form a pipeline of considerable length. A typical application of joints made according to the invention is to join pipes lined with thermoplastic liners for corrosion control. The resulting pipeline is then coiled on a pipe reel. The reel is then placed on a reel ship which goes out to sea and pays out the pipeline to form an undersea pipeline offshore. The joints are able to tolerate coiling and uncoiling in such an application.

FIG. 5 shows a second embodiment of electrofusion fitting 110 which consists of the same main items as the first embodiment: an open-ended tubular thermoplastic e.g. polyethylene body 112; a central, annular recess 116 formed in the external surface; and a first heating coil 118 and a second heating coil 120 which are wound in respective annular machined recesses 122, 124 in the outside surface portions 125, 127 of the body 112.

The second embodiment shown in FIG. 5 differs from the first embodiment shown in FIG. 1 by containing a support body 114 of thermoplastic material e.g. acetal, instead of a metal support body.

The fitting shown in FIG. 5 is made as follows:

An open-ended tubular support body 114 is injection moulded using acetal as the thermoplastic material (FIG. 6). Two outwardly projecting, radial spigots 128, 130 are integrally moulded with the body 114.

An electrical conductor assembly, consisting of a length of conductor wire 132 and two electrically conductive connectors 134, 136 one at each end of the wire 132, is connected between the spigots 128, 130 by pushing a connector 134, 136 onto the spigot 128, 130.

It is preferred that the body 114 be moulded with an external longitudinal groove (not shown) extending between the spigots 128, 130. The wall thickness of the body 114 may be increased outwardly in the region of the groove. The wire 132 would then preferably be accommodated snugly in the groove so that the wire would not be dislodged or damaged during the next stage of manufacture.

The body 114, complete with the wire 132, is placed in another injection moulding machine (not shown) and the hollow tubular body 112 is then injection moulded around the support body 114. The movements of polyethylene as it is moulded around the body 114 do not dislodge, damage or break the wire 132 as it is safely accommodated within the groove (not shown) in the wall of the body 114.

The body 112 includes inwardly-projecting flanges 138 at the extreme ends of the body 112 which retain the support body 114 within the body 112. These flanges 138 are moulded as part of the injection moulding stage.

The same stage provides through-openings 140 which extend radially of the body 112 and which accommodate the spigots 128, 130 and the electrical connectors 134, 136 (FIG. 7). It should be noted that the wire 132 is shown above the support body 114 for completeness. In reality it would be accommodated within a groove described above extending longitudinally of the support body 114 within the thickness of the wall of the support body 114.

The outer end portions of the body 112 are machined as before so that each is inclined to the longitudinal axis of the body 112. Winding recesses 122, 124 are machined in the sloping outer surfaces and the central, annular recess 116 is also machined in the outer surface of the body 112.

The heating coils 118 and 120 are wound around the body 112 as before, the wire being embedded in a rectangular-section thermoplastic strip 142. The outer end of each wire which is to form the coil is connected to an electrical connector 144 (FIG. 7), which is pushed over the electrical connector 134 or 136 already in place on the spigot 128 or 130. Then the wire is wound round the body 112 to form the coil 118 or 120.

The inner end (not shown) of each wire leaving the heating coil 118 or 120 is connected to a length of wire compatible with the material which is to form the welded joint between the ends of the steel pipe. the lengths of wire thus attached are encased in insulating sleeves (as before) and are each positioned in a machined channel (not shown) connecting the heating coil recess 122 or 124 to the central recess 116. The lengths form leads (as before) which are bent outwardly so that they protrude from the fitting 110 at two points spaced apart circumferentially midway between the ends of the fitting.

Finally, a body of insulating material (not shown) is positioned in the central recess 116, as before.

In a modification (not shown) the support body 114 may be made of some other high stiffness material, such as dough-moulded epoxy resin material or some other thermoset material or other thermoplastic material.

Whatever material is used for the support body 114, whether acetal or some other material, the support body 114 does not melt during the use of the electrofusion fitting 110 to make a joint between the lines 54, 56 of the steel pipes 50, 52. The support body 114 functions in a manner similar to that of the metal support member 14 described above.

The other steps in the use of the electrofusion fitting 110 in making the joint between the pipes are exactly as already described in relation to FIGS. 1 to 4.

The heating coils 18, 20 or 118, 120 in modifications (not shown) can be made differently from the method described above. For example, bare wire can be wound in a continuous groove formed in the body 12 or 112; alternatively, the wire can be heated so that, as it is wound on the body 12 or 112, it melts the body 12 or 112 and so forms the groove as it is wound. Whatever the method involved in making the heating coils 18, 20 or 118, 120, the wire is effectively let into the surface 25, 27 or 125, 127. When the electrofusion fitting 10 or 110 is assembled with the pipes 50, 52 the turns of wire forming the heating coils are not moved, as a result. When the electrofusion fitting is connected to a source of electrical power, the turns remain out of contact with their neighbours so that short-circuiting of any turn or turns does not occur and the proper temperature is reached by the heating coils.

The dimensions given above are purely by way of example; larger diameter pipes or smaller diameter pipes can be joined by joints according to the invention.

We claim:

1. An electrofusion fitting for joining two thermoplastic liners of two steel pipes arranged end-to-end, each pipe containing one of the liners, the fitting comprising an open-ended tubular thermoplastic body having an outside surface, an inside surface, and end regions at axially opposed ends thereof, the outside surface of each of said end regions of said thermoplastic body being adjacent to a heating coil, said coil in one of said end regions being connected in series to said coil in the other of said end regions, and the outside surface of the body having a central, annular recess containing insulating material, said outside surface of each of said end regions making an angle of less than 10° with the longitudinal axis of the thermoplastic body, said outside surface of each of said end regions including first and second annular zones between which zones lies a respective one of said heating coils, said zones not being melted when said respective heating coil is energized, and said thermoplastic body containing a hollow cylindrical support body which extends parallel to said axis adjacent the inside surface of said thermoplastic body at a location opposite to the locations of the heating coils and all of said zones.

2. A fitting according to claim 1, wherein said outside surface of each of said end regions has a recess or groove between said zones to receive a wire forming one of said coils.

3. A fitting according to claim 1, wherein the outside surface of each of said end regions includes a winding recess between said zones, one of said coils being wound in each of said winding recesses, each of said coils including turns of wire embedded in a rectangular section thermoplastic strip.

4. A fitting according to claim 1, wherein said coils include electrical leads encased in insulating sleeves.

5. A fitting according to claim 1 in which each of said coils is connected to a tapped electrical connector, said connector being positioned such that it does not protrude beyond a radial outer circumference of said tubular thermoplastic body.

6. A fitting according to claim 1, wherein said central, annular recess contains a single body of insulating material.

7. A fitting according to claim 6 wherein the body of insulating material comprises a mixture of aluminum oxide and alumino-silicate fibres.

8. A fitting according to claim 1 wherein the outside surface of each of said end regions of said body is frustoconical.

9. a fitting according to claim 1 wherein the support body comprises metal.

10. A fitting according to claim 9 wherein the support body comprises a series interconnection between said coils.

11. A fitting according to claim 1 wherein the support body comprises synthetic plastics material which does not melt when the heating coils are energized.

12. A fitting according to claim 11 wherein the support body carries an electrical conductor which forms a series interconnection between said coils.

13. A fitting according to claim 11, wherein said tubular thermoplastic body comprises thermoplastic material moulded around the support body.

14. A joint between two steel pipes arranged end to end, each of said pipes containing a thermoplastic liner, the two liners being shaped at their opposing ends so as to afford a recess which accommodates an electrofusion fitting, the opposed ends of the steel pipes being joined by an arc-welded joint, said electrofusion fitting comprising an open-ended tubular body having an outside surface, an inside surface and, end regions at axially opposed ends thereof, the outside surface of each of said end regions of said thermoplastic body being adjacent to a heating coil, said coil in one of said end regions being connected in series to said coil in the other of said end regions, and the outside surface of the body having a central, annular recess containing insulating material, said outside surface of each of said regions making an angle of less than 10° with the longitudinal axis of the thermoplastic body, said, outside surface of each of said end regions including first and second annular zones between which zones lies a respective one of said heating coils, said zones not being melted when said respective heating coil is energized, and said thermoplastic body containing a hollow cylindrical support body which extends parallel to said axis adjacent the inside surface of said thermoplastic body at a location opposite to the locations of the heating coils and all of said zones.

15. A method of making an electrofusion fitting, said fitting comprising an open-ended tubular body having an outside surface, an inside surface, the outside surface, and end regions at axially opposed ends thereof, of each of said end regions of said thermoplastic body being adjacent to a heating coil, said coil in one of said end regions being connected in series to said coil in the other of said end regions, and the outside surface of the body having a central, annular recess containing insulating material, said outside surface of each of said end regions making an angle of less than 10° with the longitudinal axis of the thermoplastic body, said outside surface of each of said end regions including first and second annular zones between which zones lies a respective one of said heating coils, said zones not being melted when said respective heating coil is energized, and said thermoplastic body containing a hollow cylindrical support body which extends parallel to said axis adjacent the inside surface of said thermoplastic body adjacent a location opposite to the locations of the heating coils and all of said zones; the method comprising:

(a) arranging the support body within the thermoplastic body;

(b) machining the outside surface of the thermoplastic body to form the central, annular recess;

(c) machining the outside end surfaces of the thermoplastic body so that a machined outside surface of each of said end regions makes an angle of less than 10° with the longitudinal axis of the fitting;

(d) winding wire to form said coils each of the coils being wound on one of said machined outside end region surfaces, the windings of each coil being placed in a recess or groove in a respective machined outside end region surface, and winding the wire while it is hot onto said respective machined outside end region surface;

(e) connecting said coils in series;

(f) connecting said coils to leads which are formed of wire compatible with the material which is to form the welded joint between the ends of the steel pipes;

(g) positioning the leads so that they protrude from the fitting at two points spaced apart on a diameter midway between the ends of the fitting;

(h) fitting insulating sleeves to the leads; and (i) positioning a body of insulating material in said central, annular recess of said body.

16. A method of making an electrofusion fitting, said fitting comprising an open-ended tubular body having an outside surface, an inside surface, and end regions at axially opposed ends thereof, the outside surface of each of said end regions of said thermoplastic body being adjacent to a heating coil, said coil in one of said end regions being connected in series to said coil in the other of said end regions, and the outside surface of the body having a central, annular recess containing insulating material, said outside surface of each of said end regions making an angle of less than 10° with the longitudinal axis of the thermoplastic body, said outside surface of each of said end regions including first and second annular zones between which zones lies a respective one of said heating coils, said zones not being melted when said respective heating coil is energized, and said thermoplastic body containing a hollow cylindrical support body which extends parallel to said axis adjacent the inside surface of said thermoplastic body adjacent a location opposite to the locations of the heating coils and all of said zones; the method comprising:

(a) arranging the support body within the thermoplastic body;

(b) machining the outside surface of the thermoplastic body to form the central, annular recess;

(c) machining the outside end surfaces of the thermoplastic body so that a machined outside surface of each of said end regions makes an angle of less than 10° with the longitudinal axis of the fitting;

(d) winding wire to form said coils, each of the coils being wound on one of said machined outside end region surfaces, the windings of each coil being placed in a recess or groove in a respective machined outside end region surface, and winding the wire while it is hot onto said respective machined outside end surface;

(e) connecting said coils in series;

(f) positioning a tapped electrical connector on said body for each coil, (g) connecting each of the coils to its respective tapped electrical connector; and (h) positioning said insulating material in said central, annular recess of said body.

17. A method of making a joint between two steel pipes arranged end to end each containing a thermoplastic liner, the two liners being shaped at their opposing ends so as to afford a recess which accommodates an electrofusion fitting, the method comprising:

providing an electrofusion fitting comprising an open-ended tubular thermoplastic body having an outside surface, an inside surface, and end regions at axially opposed ends thereof, the outside surface of each of said end regions of said thermoplastic body being adjacent to a heating coil, said coil in one of said end regions being connected in series to said coil in the other of said end regions, and the outside surface of the body having a central, annular recess containing insulating material, said outside surface of each of said end regions making an angle of less than 10° with the longitudinal axis of the thermoplastic body, said outside surface of each of said end regions including first and second annular zones between which zones lies a respective one of said heating coils, said zones not being melted when said respective heating coil is energized, and said thermoplastic body containing a hollow cylindrical support body which extends parallel to said axis adjacent the inside surface of said thermoplastic body at a location opposite to the locations of the heating coils and all of said zones;

positioning the electrofusion fitting in the recesses afforded by the liners;

connecting an electrical supply to said heating coil to weld the fitting to the linings; and joining the ends of the steel pipes by arc welding to produce a welded joint between the steel pipes.

* * * * *